UNITED STATES PATENT OFFICE.

FRANK J. TONE, OF NIAGARA FALLS, NEW YORK, ASSIGNOR TO THE CARBORUNDUM COMPANY, OF NIAGARA FALLS, NEW YORK, A CORPORATION OF PENNSYLVANIA.

SILICON CARBID.

1,013,700.      Specification of Letters Patent.      Patented Jan. 2, 1912.

No Drawing.     Application filed November 1, 1905. Serial No. 285,462.

*To all whom it may concern:*

Be it known that I, FRANK J. TONE, of Niagara Falls, of the county of Niagara and State of New York, have invented an Improvement in the Manufacture of Silicon Carbid, of which the following is a specification.

My invention relates to the manufacture of silicon carbid, and especially refers to the making of silicon carbid in a dense, compacted form.

According to the well known method of manufacture of silicon carbid, a mixture of pulverized coke, sand, salt and sawdust, is subjected to great heat in an electric furnace. The resulting product is a loose aggregation of crystals of various sizes with a considerable proportion of interstices in the crystal mass.

I have discovered that if carbon, either in its amorphous form or in the form or graphite, in segregated or solid masses, rather than mixed with silica, in pulverized form, is heated in proximity to silicon or silicon compounds, the fused or volatilized silicon penetrates the pores of the carbon and forms silicon carbid *in situ*, and that this product possesses new, peculiar, and useful properties. For example, if a carbon rod or other carbon article be embedded in a mass of silica and carbon, or carborundum, or silica, or other silicious compound, and subjected to the temperature of formation of silicon carbid, there is produced to a greater or less depth on the surface of the rod a dense form of silicon carbid, which is non-porous and very solid. Chemical analysis shows that this product often contains free silicon in quantities up to four per cent., and I believe that this silicon when present may assist in cementing the silicon carbid crystals together. The product has a hardness about equivalent to that of silicon carbid produced in the ordinary manner, but has much greater toughness. If the carbon article is thin, it is possible to convert it entirely into dense silicon carbid. If the carbon piece is of some special form—as, for instance, in the form of a crucible or plate—it is possible to convert this, without changing its form, into dense silicon carbid. It is also possible to convert only the surface of the carbon article into dense silicon carbid, thus forming a silicon carbid lining or film on a carbon article.

In the practice of my invention, I proceed as above indicated by embedding the carbon article or masses to be treated in a body of carbon and silica, silicon carbid or other silicious material, and subject the entire mass to the temperature of formation of silicon carbid, preferably by passing the electric current through a central conducting-core of carbon. The vapors of silicon and silica thus produced, penetrate the pores of the carbon article, thus bringing about the results herein stated. I do not, however, limit myself to this particular method of forming silicon-containing vapors.

In the practice of my invention care should be taken not to carry the temperature to a point sufficiently high to decompose the resulting product and convert it into graphite.

I claim:

1. The process of making dense silicon carbid, which consists in heating segregated masses of carbonaceous material in proximity to a silicon-containing substance, to a temperature sufficient to cause the silicon to combine with the carbon *in situ*, and less than that required to destroy the resulting compound.

2. The process of making shaped pieces of dense silicon carbid, which consists in heating similarly shaped pieces of carbonaceous material in proximity to a silicon-containing substance, to a temperature sufficient to cause the silicon to combine with the carbon *in situ*, and less than that required to destroy the resulting compound.

3. The process of making dense silicon carbid, which consists in heating segregated masses of carbonaceous material in proximity to the vapor of a silicon-containing substance, causing the silicon to combine with the carbon *in situ*, the temperature being sufficient to cause the silicon and carbon to combine but insufficient to destroy the resulting compound.

4. The process of making shaped pieces of silicon carbid, which consists in heating similarly shaped pieces of carbonaceous material in proximity to vapors of a silicon-containing substance, and causing the combination of the silicon with the carbon *in situ*, the temperature being sufficient to cause the silicon and carbon to combine, but insufficient to destroy the resulting compound.

5. As a new article of manufacture, a carbon article having a portion of its surface covered with dense silicon carbid; substantially as described.

6. As a new article of manufacture, silicon-carbid in a dense, compacted form, characterized by great toughness and absence of crystalline outline.

7. A process for the production of molded blocks composed of silicon carbid consisting in first forming the body of pure carbon, then embedding it in finely-powdered silicon carbid and subjecting this embedded body to a firing process at a high temperature; substantially as described.

8. The herein described process of producing carbid bodies of any desired shape, which consists in molding pure carbon into the desired shape of the bodies to be obtained, embedding the said carbon bodies in a mixture of carbon and a metallic compound, the metal of which is capable of forming a carbid, the said mixture containing the metallic compound in such an excess that its metallic element is sufficient for converting the said carbon bodies into carbid bodies, and heating the said carbon bodies and the mixture to a temperature sufficiently high to evaporate the metallic element of said metallic compound, which combines with the carbon of the carbon bodies and converts them into carbid bodies; substantially as described.

9. The herein described process of producing carbid bodies of any desired shape, which consists in molding pure carbon into the desired shape of the bodies to be obtained, embedding the said carbon bodies in a mixture of carbon and silica, the said mixture containing the silica in such an excess that its silicon is sufficient for converting the said carbon bodies into carbid bodies, and heating the said carbon bodies and the mixture to a temperature sufficiently high to evaporate the silicon which combines with the carbon of the carbon bodies and converts them into carbid bodies; substantially as described.

FRANK J. TONE.

Witnesses:
T. M. MANLEY,
F. I. PIERCE.